*George Rosner, Permutation Lock.* Reissue.

REISSUED JUL 25 1871

Sheet 1. 2 Sheets

4488

WITNESSES:

R. F. Osgood

C. N. Woodward

George Rosner

INVENTOR, BY

Burke, Fraser & Osgood

Attys. Rochester N.Y.

George Rosner, Permutation Lock.

Reissue.
Sheet 2, 2 Sheets.

4488

WITNESSES

R. F. Osgood

C. N. Woodward.

George Rosner INVENTOR, By

Burke Fraser & Osgood

Attys. Rochester

N. Y.

70. LOCKS,
317

Search Room 4,488

UNITED STATES PATENT OFFICE.

GEORGE ROSNER, OF ROCHESTER, NEW YORK, ASSIGNOR TO HALBERT S. GREENLEAF, OF SAME PLACE.

IMPROVEMENT IN PERMUTATION LOCKS.

Specification forming part of Letters Patent No. 30,092, dated September 18, 1860; reissue No. 4,488, dated July 25, 1871.

*To all whom it may concern:*

Be it known that I, GEORGE ROSNER, of the city of Rochester, in the county of Monroe and State of New York, have invented a certain new and useful Improvement in Locks, of which the following is a specification:

This invention consists in combining with a set of permutation wheels or tumblers, constructed each of a rim and center, an arrangement of bolts or equivalent devices, which fasten and unfasten said rims and centers by the use of a key inserted through holes in the cams in the wheels by which said bolts or equivalent devices are operated, the effect being to enable the relative position of the rims and centers to be changed so as to make a new combination by moving the driving-pins to different positions relatively to the slots in the wheels. It further consists in the arrangement of parts, as hereinafter described.

Figure 1:
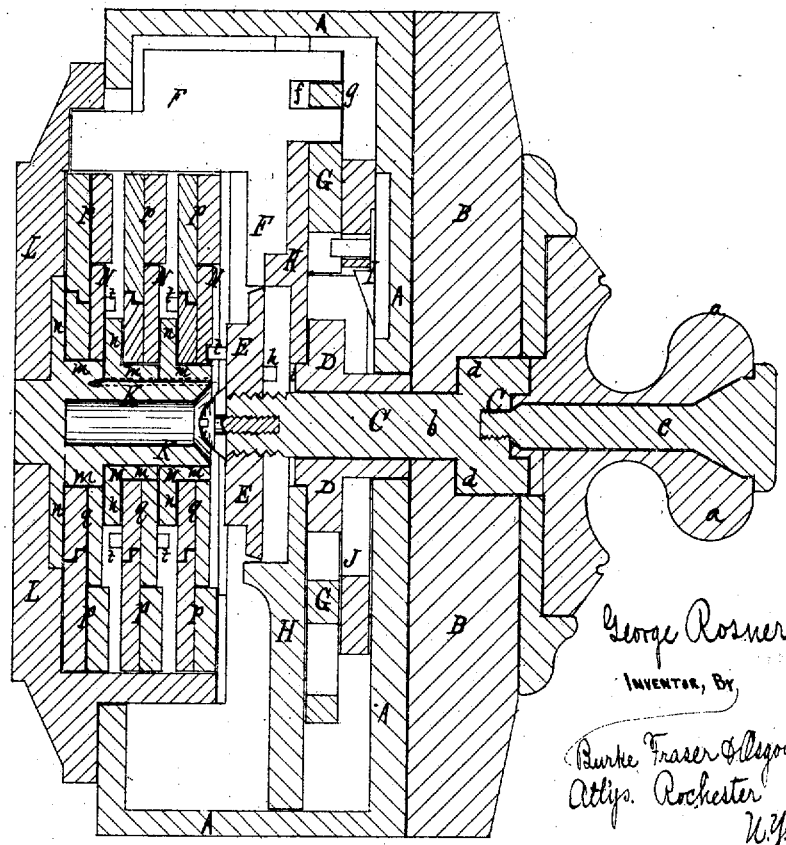
Figure 2:
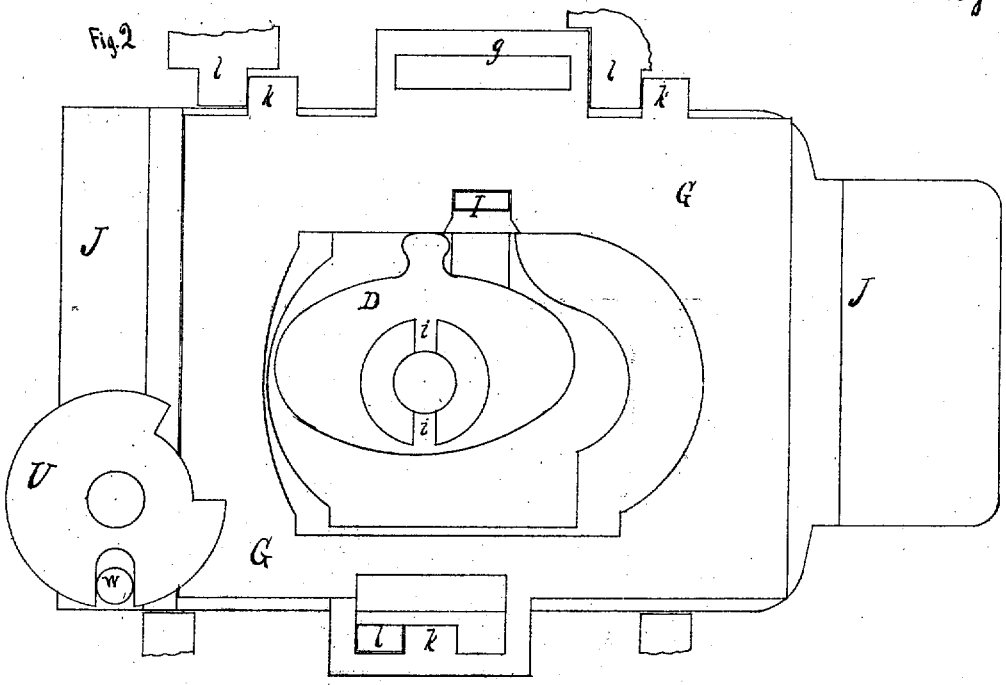
Figure 3:
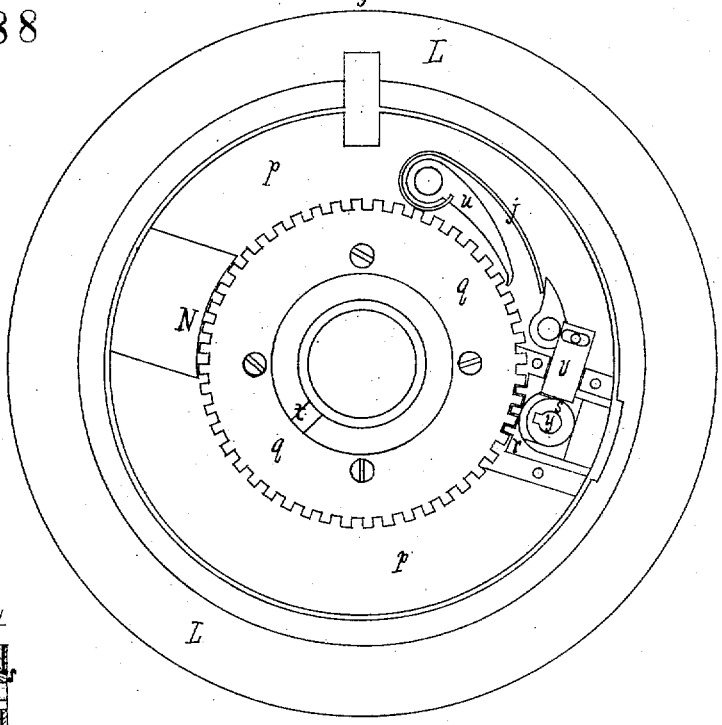
Figure 4:
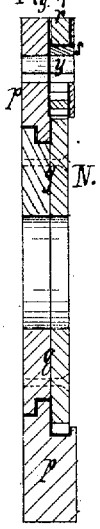
Figure 6:
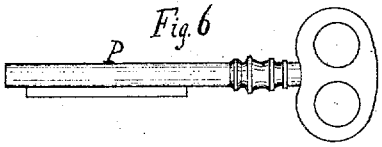
Figure 7:
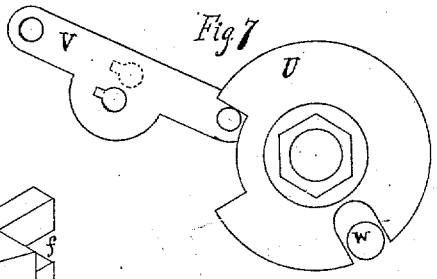
Figure 5:
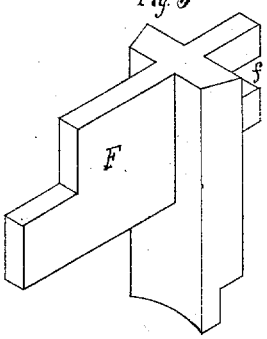

In the drawing, Figure 1 is a central vertical section of my improved lock; Fig. 2, a face view of the lock-bolt and tumbler and connecting parts removed from the lock-case; Fig. 3, a face view of one of the permutation wheels, together with a portion of the surrounding box that incloses it; Fig. 4, a section of the same; Fig. 5, a perspective view of the vertically-acting portion of the sliding tumbler; Fig. 6, a view of the key, by the use of which the combination of the wheels is changed; Fig. 7, a view of the device for closing and unclosing the key-hole in the back of the lock.

A represents the case of the lock attached to the door or other body B. C is the spindle, which is made up of a knob, *a*, and interior turning part *b*, connected by means of a screw-bolt, *c*, which allows the knob to be taken off at pleasure. The outer end of the interior portion has a head or shoulder, *d*, which prevents the spindle from being driven in. D is the cam, which rests loosely upon the spindle, so that the latter can be drawn endwise through it; and E is the disk or head, on which rests the dog F, which forms the vertically-sliding portion of tumbler G. The dog slides up and down in a guide of the division-plate H, and its connection with the sliding tumbler in the rear is made by means of a notch, *f*, Fig. 1, made therein, in which rests a bearing, *g*, Fig. 2, of the tumbler. The tumbler G rests between guides of the block-bolt J, and moves bodily with it backward and forward as the bolt is thrown. The bearing *g* is made of sufficient length to allow the throwing movement in the notch of the dog. The tumbler G is held up by a spring, I, when the spindle is thrust inward to engage with the wheels, as shown in Fig. 1. When the spindle is drawn outward or backward the cam D comes in contact with said spring and depresses it so as to allow the tumbler to fall. This, however, can occur only when the dog F comes in line with all the notches of the combination wheels. When this is the case the tumbler falls with the dog, thus engaging with the cam D′, and the bolt can be thrown in or out. The cam receives motion on the retraction of the spindle by means of a pin, *h*, on the back of disk E, which strikes into and engages with a notch or slot, *i*, of the face of the cam. When the lock-bolt is protruded projections *k k* of the tumbler engage with stops *l l* of the case, and thus hold the bolt in position. It is only when the tumbler falls, as before described, that the bolt can be retracted. K represents a stationary stud of the box L, which forms the back of the lock and holds the combination wheels. On this stud are slipped washers M M, one after another, as fast as the wheels N N are applied. These wheels rest and turn upon the horizontal bearings *m m* of the washers, while the vertical flanges *n n* of the washers divide them and prevent their contact in turning. The wheels N N are composed of an annular outer rim, *p* and *a*, center or hub, *q*, formed of two pieces, the parts composing the center or hub being rigidly secured together so as to allow them to move the same as if they were a single piece. As the rim and center are relatively adjusted from time to time to bring the driving-pins of the centers in different relative positions with the slots of the rims, so the combination of the lock is changed.

Prior to my invention, in order to change the combination where a single set of wheels only was used, made up each of a center-hub and rim, the wheels had to be removed from the lock and adjusted by hand and then replaced.

I obviate this difficulty by the following arrangement: Opposite the center or hub *q* of each wheel, and located in the outer rim, I place a locking device or bolt, *r*, which, when forced in against the said center or hub, holds the same firmly in place with the outer rim, but when thrown out disengages said parts and allows the centers to turn free while the rims remain stationary. Against the locking device or bolt *r* rests a cam or eccentric, *s*. Through each or all of these cams, and also through the back plate of the lock, is inserted a key, P, Fig. 6, by turning which it will be seen that said locking or fastening device may be forced in or drawn out at pleasure. When the key is inserted and the fastening device thrown back, it will be seen that the rims of the wheels are held stationary by the key, while the centers may be turned to any different position by the spindle, thus setting the lock to a new combination. Motion is communicated from the disk E to the first wheel, and from one wheel to another, by means of pins *t t*, which strike together during the revolution. This arrangement of pins was in use before my invention.

The novelty in the first part of my invention consists in the combination of the fastening devices *r* with the wheels, constructed of three parts each, an outer rim and a center or hub composed of two parts, secured together so that by inserting the key the parts composing the wheels may be loosened and the outer rims held stationary while the centers or hubs are turned to a different position by the action of the spindle to rearrange the combination, and then the parts locked in place again, and all accomplished without removing the wheels themselves from the lock. In all prior locks with a single set of wheels, (each wheel made up of a rim and center hub,) so far as I am aware, the wheels had to be removed from the lock and the combination changed by hand.

If desired, a click, *u*, may be employed, in connection with the first wheel, to stop the motion opposite a given number and not half-way between. A block, *v*, may also be used, acted upon by the spring *j*, to hold the cam *s* when the latter has made a half revolution. This prevents any accidental motion given to the part *r*.

U represents a disk attached to the back part of the lock, which disk is partly rotated by the motion of the lock-bolt, which has a pin, *w*, fitted in a notch of the disk. At the latter part of the movement of the lock-bolt the pin suddenly turns the disk, thereby moving the lever V connected therewith and covering and uncovering the key-hole *y* accordingly which way the bolt is thrown. This is shown most clearly in Fig. 7.

What I claim, and desire to secure by Letters Patent is—

1. In a permutation lock, in combination with a set of wheels consisting each of an outer ring or rim and a central disk or hub, a set of fastening devices or bolts, *r r*, which is made to fasten or unfasten said parts composing the wheels by the insertion of a key through each or all of the wheels, whereby the combination of the lock may be changed, substantially as herein specified.

2. In connection with the fixed stud K, the annular bearings M M, provided with horizontal bearings *m* and vertical flanges *n n*, which are slipped upon said stud to hold the wheels, as described.

3. The combination of the disk U and lever V with the lock-bolt and case of the lock for the purpose of covering the key-hole when the bolt is protruded, as herein described.

4. The disk E attached to the spindle C, when combined with the dog F and the wheels N N N, so as to support said dog from said wheels when the spindle is engaged with the wheels, and to allow said dog to fall when disengaged, substantially as specified.

In witness whereof I have hereunto set my hand this 8th day of June, 1871.

GEORGE ROSNER.

Witnesses:
ARCHD. BAINE,
R. F. OSGOOD.